No. 892,291. PATENTED JUNE 30, 1908.
J. McINTYRE.
VEHICLE WHEEL.
APPLICATION FILED APR. 13, 1907.

Witnesses.
C. H. Gannett
J. Murphy.

Inventor.
James McIntyre
By Jas. H. Churchill
Atty.

UNITED STATES PATENT OFFICE.

JAMES McINTYRE, OF BOSTON, MASSACHUSETTS, ASSIGNOR TO JAMES EDGAR McINTYRE, OF BOSTON, MASSACHUSETTS.

VEHICLE-WHEEL.

No. 892,291.  Specification of Letters Patent.  Patented June 30, 1908.

Application filed April 13, 1907. Serial No. 368,082.

*To all whom it may concern:*

Be it known that I, JAMES McINTYRE, a citizen of the United States, residing in Boston, in the county of Suffolk and State of Massachusetts, have invented an Improvement in Vehicle-Wheels, of which the following description, in connection with the accompanying drawings, is a specification, like letters on the drawings representing like parts.

This invention relates to tires for vehicle wheels and has for its object to provide a strong, durable and resilient tire especially adapted for use on commercial and pleasure vehicles. For this purpose I employ a rubber tire having a solid tread portion and with a hollow interior, which contains one or more wire cables covered with soft rubber, which may be scored transversely to impart additional resiliency to the tire. The wire cables may and preferably will have a cotton or fibrous center. These and other features of this invention will be pointed out in the claims at the end of this specification.

Figure 1:
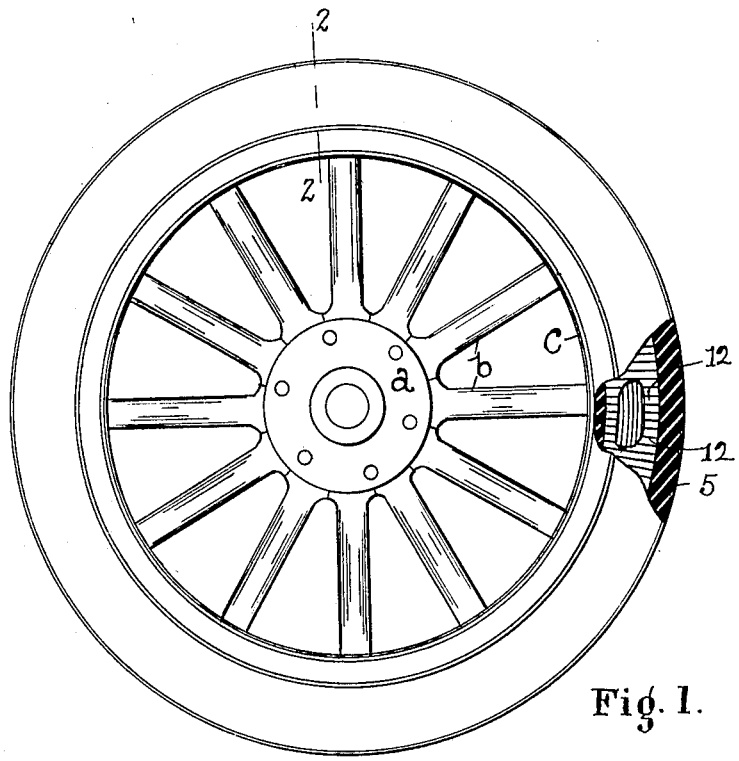
Figure 2:
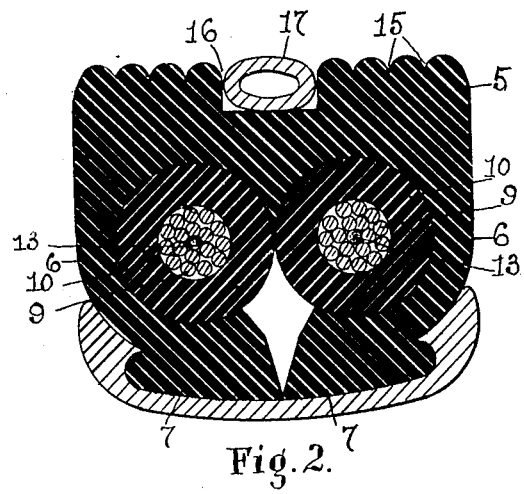

Figure 1 is a side elevation of a vehicle wheel embodying this invention. Fig. 2, a cross section on an enlarged scale taken on the line 2—2, Fig. 1.

The hub *a*, spokes *b* and felly *c* of the wheel may be of any suitable or usual construction. The felly *c* has applied to it a tire embodying this invention and comprising a solid tread portion 5 of substantially firm rubber, and side portions 6 having inwardly extended flanges 7, which are shaped on their under surface to engage the felly and to be clenched thereto, after the manner of the well-known clencher tire, or they may be otherwise secured thereto. The sides 6 and their flanges 7 form with the tread portion 5 an annular chamber, within which are located preferably two wire cables 9, provided with covers 10 of soft rubber, which for the best results are made of considerable thickness and provided with transverse cuts or slits 12, which extend from the outside toward the wire cable, to impart to the center of the tire additional resiliency.

The wire cables 9 may and preferably will have a center 13 of cotton or other fiber. The sides 6 and flanges 7 are made curved on their inner surfaces, and the under surface of the tread portion 5 is provided with two curved surfaces located on opposite sides of the longitudinal center of the tread and which coöperate with the curved inner surfaces of the sides and flanges to engage the rubber covering 10 of the wire cables.

In practice, the wire cables are spliced to form rings, after which the rubber coverings are molded thereon.

The tread portion 5 may be made smooth on its exterior or it may be provided with corrugations 15 and with a central annular depression or pocket 16 for the reception of a link chain 17 or other non-skidding or gripping device. The tread portion 5 of the tire may be vulcanized materially harder than the sides 6 and bottom flanges 7, and the rubber coverings 10 for the wire cables may be of the same hardness as the sides 6 and flanges 7 or they may be of softer rubber, so that in the completed tire, provision is made for obtaining a durable wearing tread portion, which is backed up by yielding sides and center portions, which give to the tire the resiliency desired, while the wire cables serve to materially strengthen the tire.

The tire herein shown and described is especially designed for wheels used on automobiles and particularly with commercial vehicles, but it will be understood that it may be used to advantage on pleasure vehicles. So also it may be used on carriages and wagons. It will be understood that the flanges 7 are separate from each other and may be spread apart for the insertion of the rubber covered cables.

Claims.

1. A vehicle tire comprising a rubber tread portion having sides provided with inturned flanges forming an annular chamber within the tire, and wire cables located in said chamber on opposite sides of the longitudinal center of the tire and having coverings of softer rubber than said tread, substantially as described.

2. A vehicle tire comprising a rubber tread portion having sides provided with inturned flanges forming an annular chamber within the tire, and wire cables located in said chamber on opposite sides of the longitudinal center of the tire and having coverings of softer rubber than said tread and provided with slits extended transversely of said coverings, substantially as described.

3. A vehicle tire comprising a rubber tread portion having sides provided with inturned flanges forming an annular chamber within the tire, and a wire cable located within said chamber and having a covering of rubber engaging the said tread portion and said flange, substantially as described.

4. A vehicle tire comprising a rubber tread portion having sides provided with inturned flanges of rubber softer than said tread portion and forming an annular chamber, wire cables located in said chamber and provided with coverings of rubber of substantial thickness and softer than said tread portion, substantially as described.

5. A vehicle tire comprising a rubber tread portion having sides provided with inturned flanges forming an annular chamber within the tire, and a wire cable located within said chamber and having a covering of rubber of substantial thickness and provided with slits extended but partially through said covering, substantially as described.

6. A vehicle tire comprising a tread portion of substantially firm or hard rubber having sides provided with inturned flanges of softer rubber, and forming with said tread an annular chamber, and a reinforcing core within said chamber having a covering of rubber of substantial thickness and softer than said tread portion, substantially as described.

In testimony whereof, I have signed my name to this specification in the presence of two subscribing witnesses.

JAMES McINTYRE.

Witnesses:
   Jas. H. Churchill,
   J. Murphy.